US 9,174,077 B2

(12) United States Patent
Lim

(10) Patent No.: US 9,174,077 B2
(45) Date of Patent: Nov. 3, 2015

(54) BRACKET FOR FIXING FIRE-FIGHTING SPRINKLER

(71) Applicant: Young Sun Lim, Bucheon-si (KR)

(72) Inventor: Young Sun Lim, Bucheon-si (KR)

( * ) Notice: Subject to any disclaimer, the term of this patent is extended or adjusted under 35 U.S.C. 154(b) by 0 days.

(21) Appl. No.: 14/366,116

(22) PCT Filed: Apr. 11, 2013

(86) PCT No.: PCT/KR2013/003046
§ 371 (c)(1),
(2) Date: Jun. 17, 2014

(87) PCT Pub. No.: WO2013/157777
PCT Pub. Date: Oct. 24, 2013

(65) Prior Publication Data
US 2015/0060613 A1    Mar. 5, 2015

(30) Foreign Application Priority Data

| Apr. 16, 2012 | (KR) | ........................ 10-2012-0039133 |
| Apr. 16, 2012 | (KR) | ........................ 10-2012-0039134 |
| May 10, 2012 | (KR) | ........................ 10-2012-0049676 |
| May 11, 2012 | (KR) | ........................ 10-2012-0050132 |
| Apr. 9, 2013 | (KR) | ........................ 10-2013-0038793 |

(51) Int. Cl.
*A62C 13/76* (2006.01)
*A62C 35/68* (2006.01)
*F16B 2/10* (2006.01)
*F16B 5/06* (2006.01)
(Continued)

(52) U.S. Cl.
CPC . *A62C 35/68* (2013.01); *F16B 2/10* (2013.01);
*F16B 2/185* (2013.01); *F16B 5/06* (2013.01);
*F16L 3/10* (2013.01)

(58) Field of Classification Search
CPC ........... A62C 35/68; F16B 2/10; F16B 2/185;
F16B 2/18; F16B 5/06; F16B 5/121; F16L
3/10; F16L 3/1075; F16L 3/24; E04B 9/006
USPC ......... 248/75, 72, 73, 65, 230.2, 231.31, 343;
248/230.4, 222.52, 231.51; 169/37, 41;
239/209
See application file for complete search history.

(56) References Cited

U.S. PATENT DOCUMENTS

| 3,567,169 | A | * | 3/1971 | Frederick et al. ............. 248/317 |
| 4,487,523 | A | * | 12/1984 | Monroe ........................ 403/385 |
| 7,264,214 | B2 | * | 9/2007 | Oh .................................. 248/342 |

(Continued)

FOREIGN PATENT DOCUMENTS

| EP | 2380635 | 10/2011 |
| KR | 1020050052415 | 6/2005 |

(Continued)

OTHER PUBLICATIONS

International Search Report—PCT/KR2013/003046 dated Jul. 11, 2013.

*Primary Examiner* — Anita M King
(74) *Attorney, Agent, or Firm* — Cantor Colburn LLP

(57) ABSTRACT

Provided is a bracket for fixing a fire-fighting sprinkler, which is equipped with a locking part including a cam protrusion having an eccentric axis and configured to securely fix a support frame and a sprinkler by pivotal movement, thereby enabling a technician to easily mount or demount the bracket at a desired position without any interruption.

10 Claims, 10 Drawing Sheets

(51) Int. Cl.
*F16B 2/18* (2006.01)
*F16L 3/10* (2006.01)

(56) References Cited

U.S. PATENT DOCUMENTS

| | | | | |
|---|---|---|---|---|
| 7,735,787 | B2 * | 6/2010 | Kafenshtok et al. | 248/75 |
| 8,413,734 | B2 * | 4/2013 | Silcox et al. | 169/43 |
| 8,500,079 | B2 * | 8/2013 | Oh | 248/343 |
| 8,820,686 | B2 * | 9/2014 | Hickle et al. | 248/65 |
| 8,833,718 | B2 * | 9/2014 | Oh | 248/343 |
| 8,833,719 | B2 * | 9/2014 | Lim | 248/343 |
| 9,004,422 | B2 * | 4/2015 | Feenstra | 248/200.1 |
| 9,068,689 | B2 * | 6/2015 | Hickle et al. | |
| 2005/0139743 | A1 * | 6/2005 | Shim | 248/342 |
| 2010/0117281 | A1 * | 5/2010 | Doyle | 269/97 |
| 2011/0186697 | A1 | 8/2011 | Hickle et al. | |
| 2011/0260012 | A1 | 10/2011 | Oh | |
| 2012/0097406 | A1 * | 4/2012 | Silcox et al. | 169/51 |

FOREIGN PATENT DOCUMENTS

| | | |
|---|---|---|
| KR | 1020070117795 | 12/2007 |
| KR | 200440808 | 6/2008 |
| KR | 1020120032337 | 4/2012 |

* cited by examiner

BRACKET FOR FIXING FIRE-FIGHTING SPRINKLER

TECHNICAL FIELD

The present invention relates to a bracket for fixing a fire-fighting sprinkler, which includes end brackets mounted to both end portions of a support frame to fix the support frame to a ceiling and a center bracket to fix a fire-fighting sprinkler to the support frame, and more particularly to a bracket for fixing a fire-fighting sprinkler, which is equipped with a locking part including a cam protrusion having an eccentric axis and configured to securely fix the support frame and the sprinkler by pivotal movement and enables a technician to easily mount or demount the center bracket at a desired position without any interruption.

BACKGROUND ART

Fire-fighting sprinklers are connected to a plurality of branch pipes which are branched from a fire-extinguishing liquid supply pipe and are fixed to support frames with a constant interval therebetween using center brackets. There are many kinds of center brackets for supporting sprinklers. One of them is a center bracket having a structure that can be assembled and disassembled. When using such a center bracket, individual components are assembled and a sprinkler is fixed by fastening a bolt. However, in order to support the sprinkler, the center bracket should be first disassembled and then a bolt should be additionally fastened to assemble the center bracket and fix the sprinkler. Therefore, the sprinkler fixing process is complicated and inconvenient.

An integral type center bracket developed by the present inventor is disclosed in Korean Patent Publication No. 10-2005-0052415. Another type of center bracket for a fire-fighting sprinkler developed by the present inventor is disclosed in Korean Utility Model Registration No. 20-0440808.

DISCLOSURE

Technical Problem

It is an object of the present invention to provide a center bracket for fixing a fire-fighting sprinkler, which is equipped with a locking part including a cam protrusion having an eccentric axis, to thereby fix a sprinkler fitted in a concave portion of the center bracket without any interruption by pivoting the cam protrusion to pressurize the sprinkler.

It is another object of the present invention to provide a center bracket for fixing a fire-fighting sprinkler, which is equipped with a locking part that enables a technician to fix a sprinkler without any interruption while keeping a side portion of the center bracket opened.

Technical Solution

In accordance with an aspect of the present invention, the above and other objects can be accomplished by the provision of a bracket for fixing a fire-fighting sprinkler including end brackets mounted to both end portions of a support frame to fix the support frame to a ceiling and a center bracket to fix the fire-fighting sprinkler to the support frame, in which the center bracket includes an opened side portion, a hinge pin and a locking part coupled to the hinge pin and configured to pivot about the hinge pin. The locking part includes a cam lever and a cam protrusion having an eccentric axis. The sprinkler fitted in the center bracket is directly pressurized and clamped by the cam protrusion by pivoting the locking part about the hinge pin while keeping the opened side portion opened.

The center bracket further includes a contact piece provided between the cam lever and the sprinkler in order to securely fix the sprinkler.

Advantageous Effects

As the cam lever coupled to the center bracket pivots, the cam protrusion of the cam lever causes the contact piece coupled to the center bracket to move linearly so that the sprinkler is securely clamped by a concave portion of the contact piece. Accordingly, the sprinkler can be fixed to the center bracket rapidly and easily. Further, since the contact piece is securely coupled to the center bracket, the sprinkler can also be securely fixed to the center bracket and the center bracket can be prevented from being damaged or released from the sprinkler although strong torque is applied thereto.

In addition, it is easy and simple without interruption to mount the end brackets to both end portions of the support frame and to mount the center bracket to a central portion of the support frame.

DESCRIPTION OF DRAWINGS

The above and other objects, features and other advantages of the present invention will be more clearly understood from the following detailed description taken in conjunction with the accompanying drawings, in which.

BEST MODE

Figure 1:
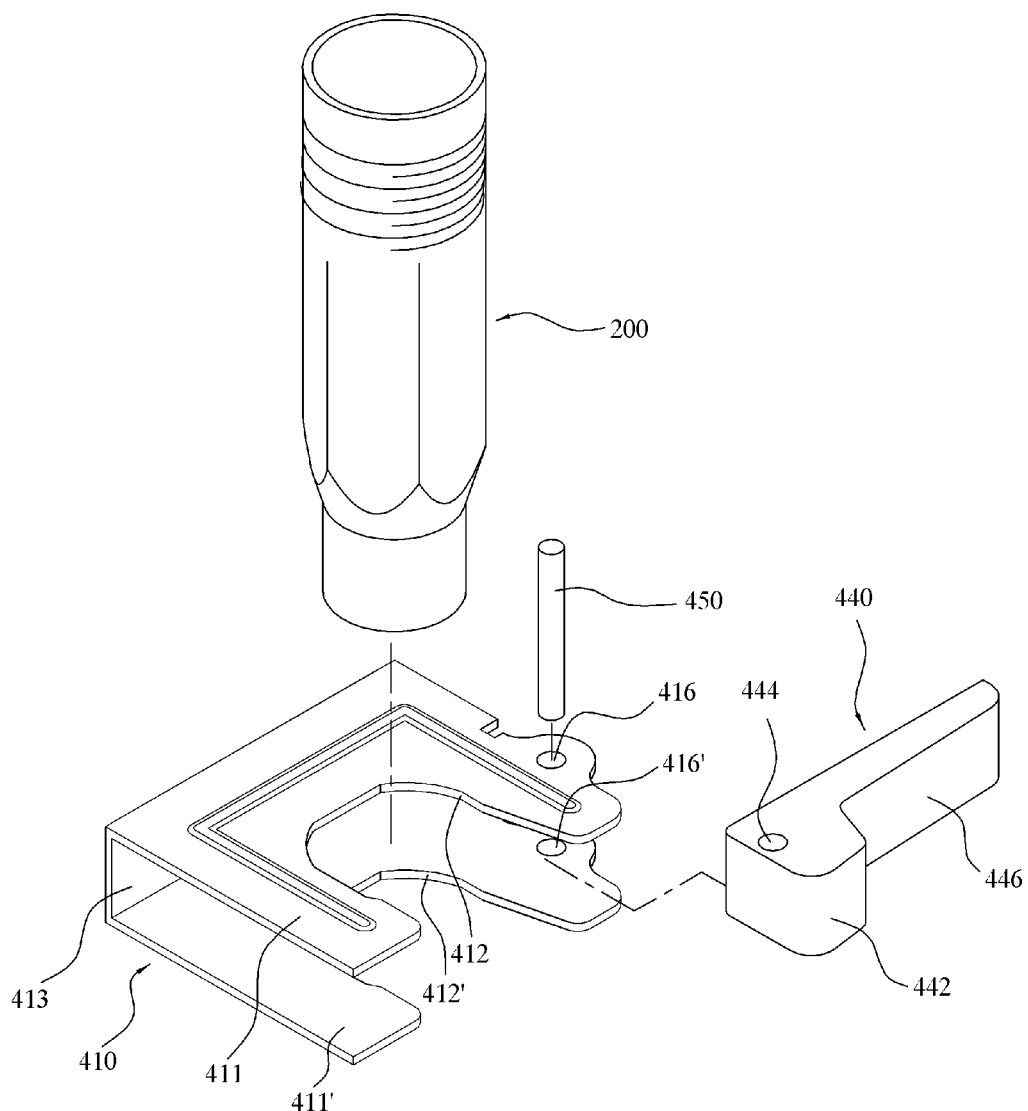
FIG. 1 is an exploded perspective view illustrating a center bracket for fixing a fire-fighting sprinkler according to an embodiment of the present invention.
Figure 2:
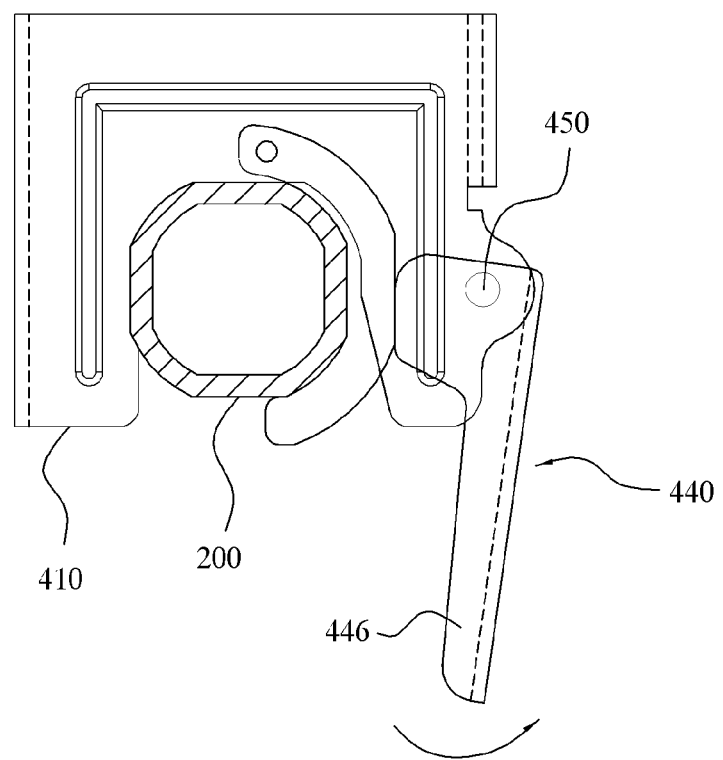
FIG. 2 is an exploded plan view illustrating the center bracket for fixing a fire-fighting sprinkler according to an embodiment of the present invention.

Now, preferred embodiments of the present invention will be described in detail with reference to the annexed drawings.

A bracket for fixing a fire-fighting sprinkler according to the present invention illustrated in FIGS. 1 through 9 comprises end brackets mounted to both end portions of a support frame to fix the support frame to a ceiling, and a center bracket to fix a fire-fighting sprinkler to the support frame. The center bracket includes an opened side surface, concave portions and a locking part 440. The locking part 440 includes a cam lever 446 and a cam protrusion 442 having an eccentric axis. After the support frame 100 is inserted into the center bracket and the sprinkler 200 is fitted in the concave portions of the center bracket, the sprinkler 200 can be securely fixed to the center bracket by fastening the locking part 440 to the center bracket so that the cam protrusion 442 pressurizes the sprinkler 200. The present invention has characteristics that the opened side surface of the center bracket is kept opened even after the sprinkler 200 is fixed to the center bracket.

Describing in detail, as shown in FIGS. 1 through 5, a center bracket 410 includes bent plates 411 and 411' having an opened side portion. The bent plates 411 and 411' are respectively formed with concave portions 412 and 412'. After a sprinkler 200 is fitted in the concave portions 412 and 412', a cam lever 446 pivots so that a cam protrusion 442 pressurizes the sprinkler 200 and clamps the same. The opened side portion of the center bracket is kept opened even after the sprinkler 200 is clamped to the center bracket.

The center bracket 410 is formed with pin holes 416 and 416' at an edge portion thereof, through which a hinge pin 450 is fitted, so that a locking part 440 can be coupled to the center bracket 410.

The locking part 440 includes a cam lever 446 and a cam protrusion 442 formed at one end portion of the cam lever 446. The cam protrusion 442 is formed with a pin hole 444 at an edge portion thereof corresponding to the pin holes 416 and 416' of the center bracket 410. By virtue of the hinge pin 450 fitted through the pin hole 444 of the locking part 440 and the pin holes 416 and 416' of the center bracket 410, the locking part 440 can be coupled to the center bracket 410 and also can pivot about the hinge pin 450 with respect to the center bracket 410.

Figure 3:
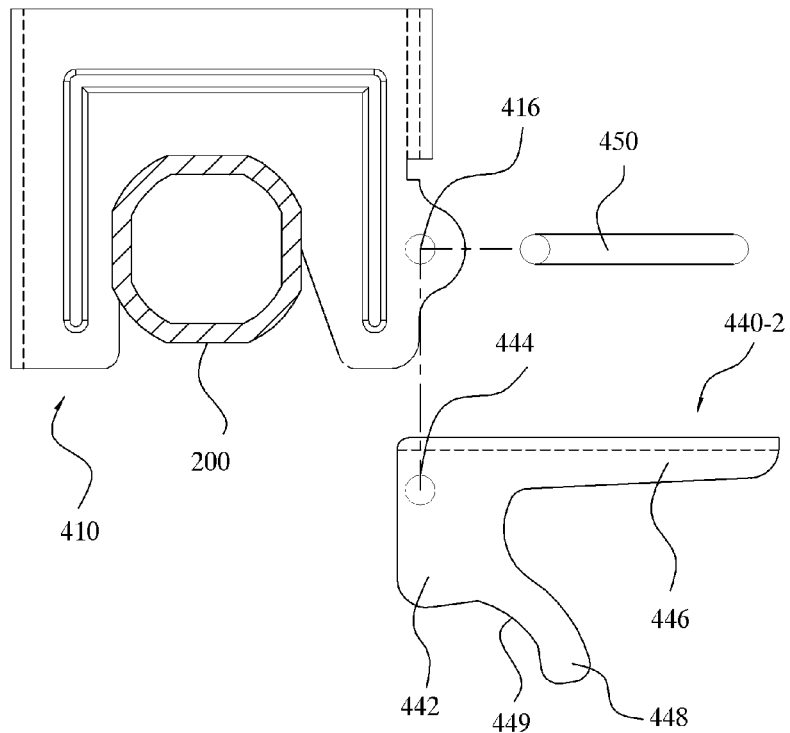
FIG. 3 is an exploded view illustrating a center bracket for fixing a fire-fighting sprinkler according to another embodiment of the present invention.
Figure 4:
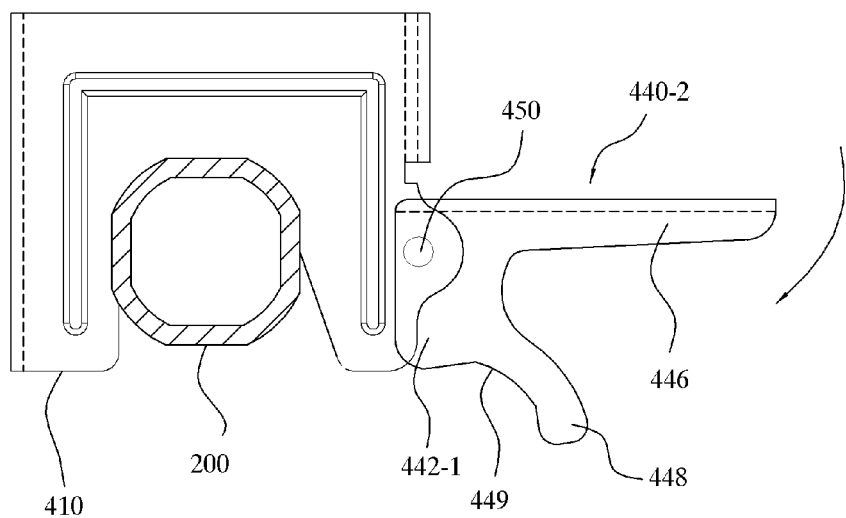
FIG. 4 is a sectional view illustrating the center bracket for fixing a fire-fighting sprinkler depicted in FIG. 3.
Figure 5:
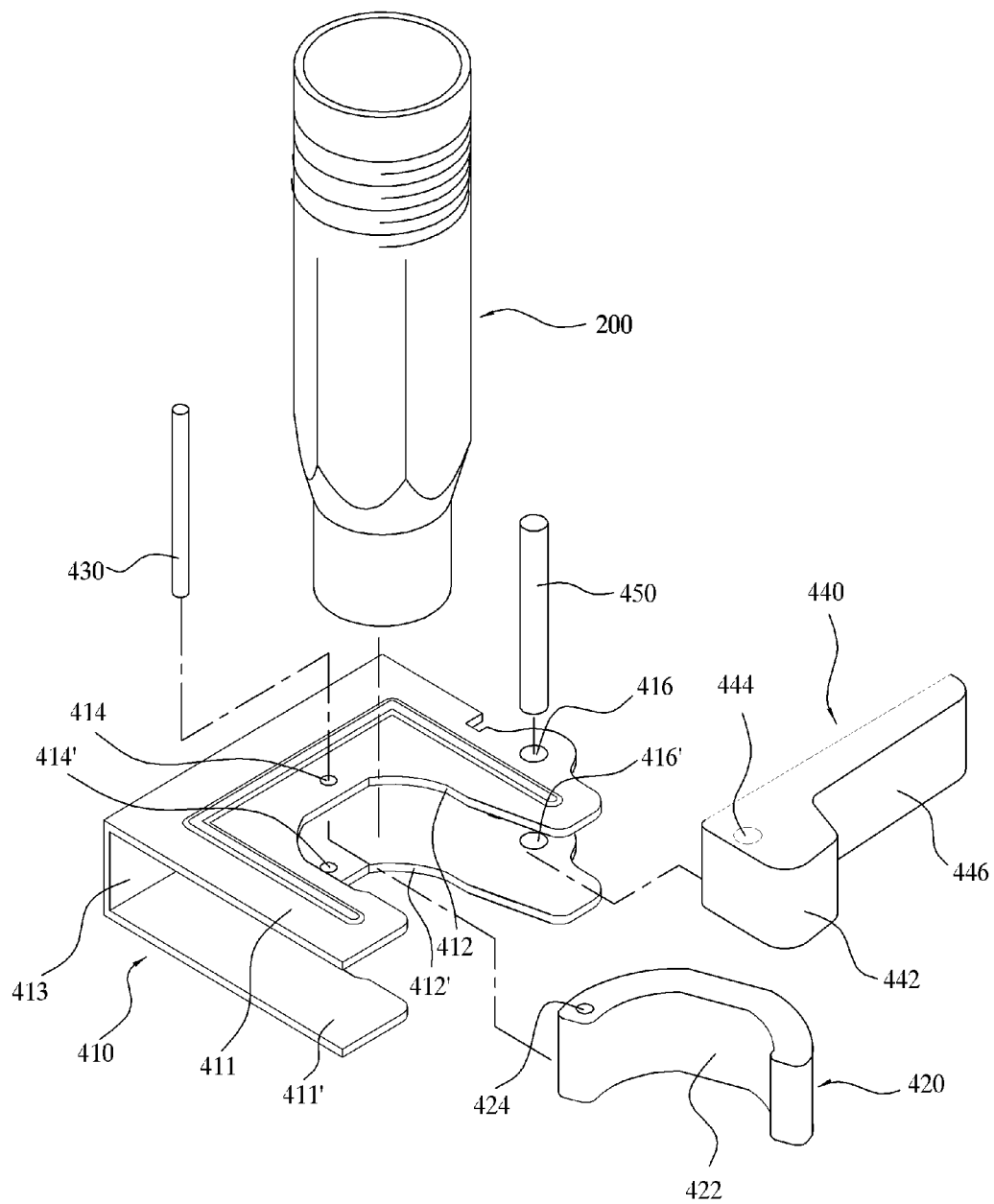
FIG. 5 is an exploded perspective view illustrating a center bracket for fixing a fire-fighting sprinkler according to a further embodiment of the present invention.
Figure 6:
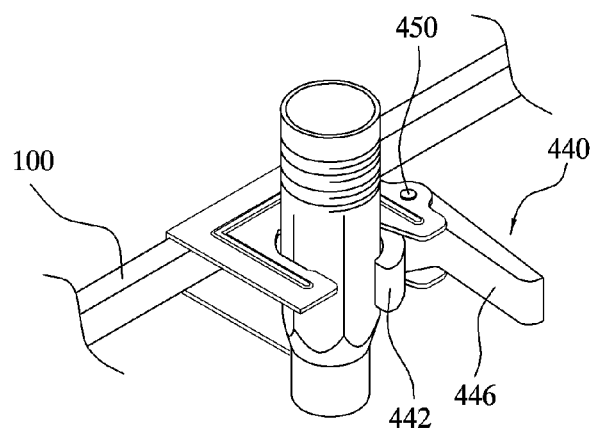
FIG. 6 is a perspective view illustrating the center bracket for fixing a fire-fighting sprinkler depicted in FIG. 5.
Figure 7:
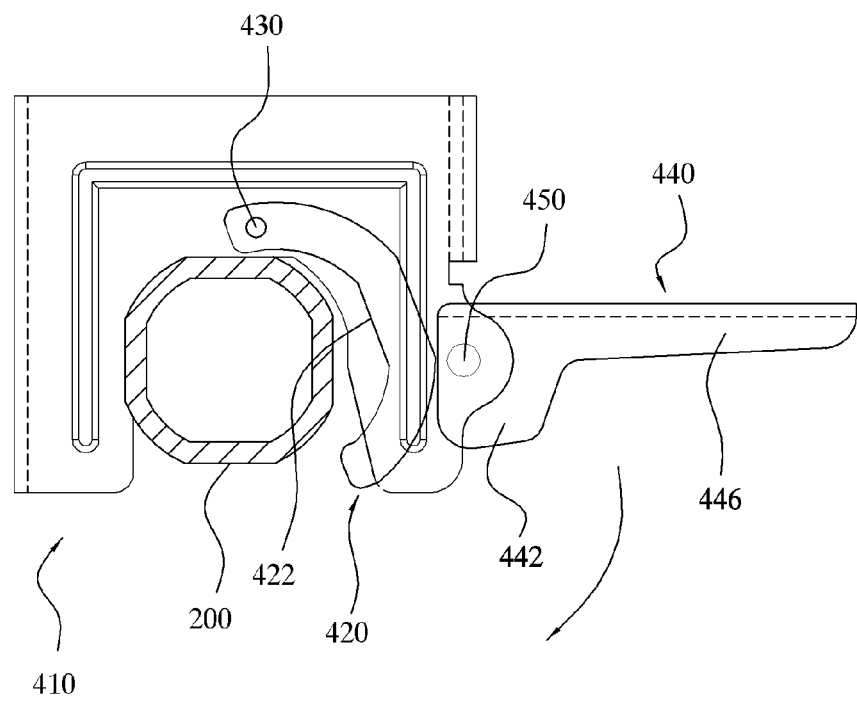
FIG. 7 is a view illustrating a coupled state of a support frame and the center bracket for fixing a fire-fighting sprinkler depicted in FIG. 6.

As shown in FIGS. 3 and 4, a bracket for fixing a fire-fighting sprinkler according to another embodiment of the present invention includes a locking part 440-2 at which a contact portion for covering the sprinkler is integrally formed.

The locking part 440-2 includes a cam lever 446 and a cam protrusion 442-1 formed at one end portion of the cam lever 446. The cam protrusion 442-1 is formed with a pin hole 444 at an edge portion thereof and is formed with a curved protrusion 448 at another edge portion thereof. A concave portion 449 is formed between the cam protrusion 442-1 and the curved protrusion 448.

The cam lever 446 of the locking part 440-2 coupled to the center bracket 410 pivots about the hinge pin 450 and accordingly, the cam protrusion 442-1, the curved protrusion 448 and the concave portion 449 of the cam lever 446 securely fix the sprinkler coupled to the center bracket 410. The opened side portion of the center bracket is kept opened even after the sprinkler 200 is clamped to the center bracket.

As shown in FIGS. 5 through 8, a center bracket for fixing a fire-fighting sprinkler according to a further embodiment of the present invention includes a contact piece 420 which is separately provided between the sprinkler and the locking part 440.

The center bracket 410 is formed with U-shaped bent plates 411 and 411' and an insertion space 413 defined by the bent plates 411 and 411'. A support frame 100 used to couple the center bracket 410 to the sprinkler 200 is fitted into the center bracket 410 through the insertion space 413, and the sprinkler 200 is surrounded by the U-shaped bent plates 411 and 411'.

The sprinkler 200 is fitted in the concave portions 412 and 412' of the center bracket 410 and is more securely fixed by the contact piece 420. The center bracket 410 is formed with pin holes 414 and 414' at a portion thereof, through which a hinge pin 430 for coupling the contact piece 420 to the center bracket 410 is fitted. The center bracket 410 is also formed with pin holes 416 and 416' at an edge portion thereof, through which a hinge pin 450 for coupling the locking part 440 to the center bracket 410 is fitted.

The contact piece 420 is disposed in the insertion space 413 of the center bracket 410 and has a curved shape so that the sprinkler 200 can be fitted through the center bracket 410 without interference with the contact piece 420. In detail, the contact piece 420 is formed with a concave portion 422 corresponding to an outer peripheral surface of the sprinkler 200 so as to closely contact the same. The contact piece 420 is formed with a pin hole 424 at an end portion thereof, through which the hinge pin 430 is inserted. By the hinge pin 430 being fitted through the pin hole 424 of the contact piece 420 and the pin holes 414 and 414' of the center bracket 410, the contact piece 420 can be coupled to the center bracket 410 and also can pivot about the hinge pin 430 with respect to the center bracket 410.

The locking part 440 is formed with a cam protrusion 442 at an end portion of the cam lever 446 and a pin hole 444 at an edge portion of the cam protrusion 442. By the hinge pin 450 fitted through the pin hole 444 of the locking part 440 and the pin holes 416 and 416' of the center bracket 410, the locking part 440 can be coupled to the center bracket 410 and also can pivot about the hinge pin 450 with respect to the center bracket 410.

By virtue of the hinge pin 430 which is fitted through the pin hole 424 of the contact piece 420 and the pin holes 414 and 414' of the center bracket 410 and the hinge pin 450 which is fitted through the pin hole 444 of the locking part 440 and the pin holes 416 and 416' of the center bracket 410, pivotal movement of the locking part 440 causes linear movement of the contact piece 420. Accordingly, the sprinkler 200 is clamped by the concave portion 422 of the contact piece 420.

Further, so as to clamp the sprinkler 200 after the support frame 100 for coupling the center bracket 410 to the sprinkler 200 is fitted through the center bracket 410, the center bracket 410 includes the U-shaped bent plates 411 and 411' having an opened side portion, and the insertion space 413 defined by the bent plates 411 and 411'. The bent plates 411 and 411' of the center bracket 410 are respectively formed with the concave portions 412 and 412'. The sprinkler 200 is fitted in the concave portions 412 and 412' of the center bracket 410 and is securely fixed by the locking part 440. The center bracket 410 is formed with the pin holes 416 and 416' at an edge portion thereof, through which the hinge pin 450 for coupling the locking part 440 to the center bracket 410 is fitted.

The locking part 440 includes the cam lever 440-1 and the cam protrusion 442 formed at one end portion of the cam lever 440-1. The cam protrusion 442 is formed with the pin hole 444 at an edge portion thereof corresponding to the pin holes 416 and 416' of the center bracket 410. The hinge pin 450 is fitted through the pin hole 444 of the cam lever 440-1 and the pin holes 416 and 416' of the center bracket 410. Accordingly, the cam lever 440-1 can be coupled to the center bracket 410 and also can pivot about the hinge pin 450 with respect to the center bracket 410.

By pivotal movement of the cam lever 440-1, the cam protrusion 442 securely fixes the sprinkler 200. Alternatively, the contact piece is formed with a separation prevention protrusion at a side surface thereof, by which the contact piece is caught by a side surface of the center bracket and thus is prevented from being separated down from the center bracket.

Figure 8:
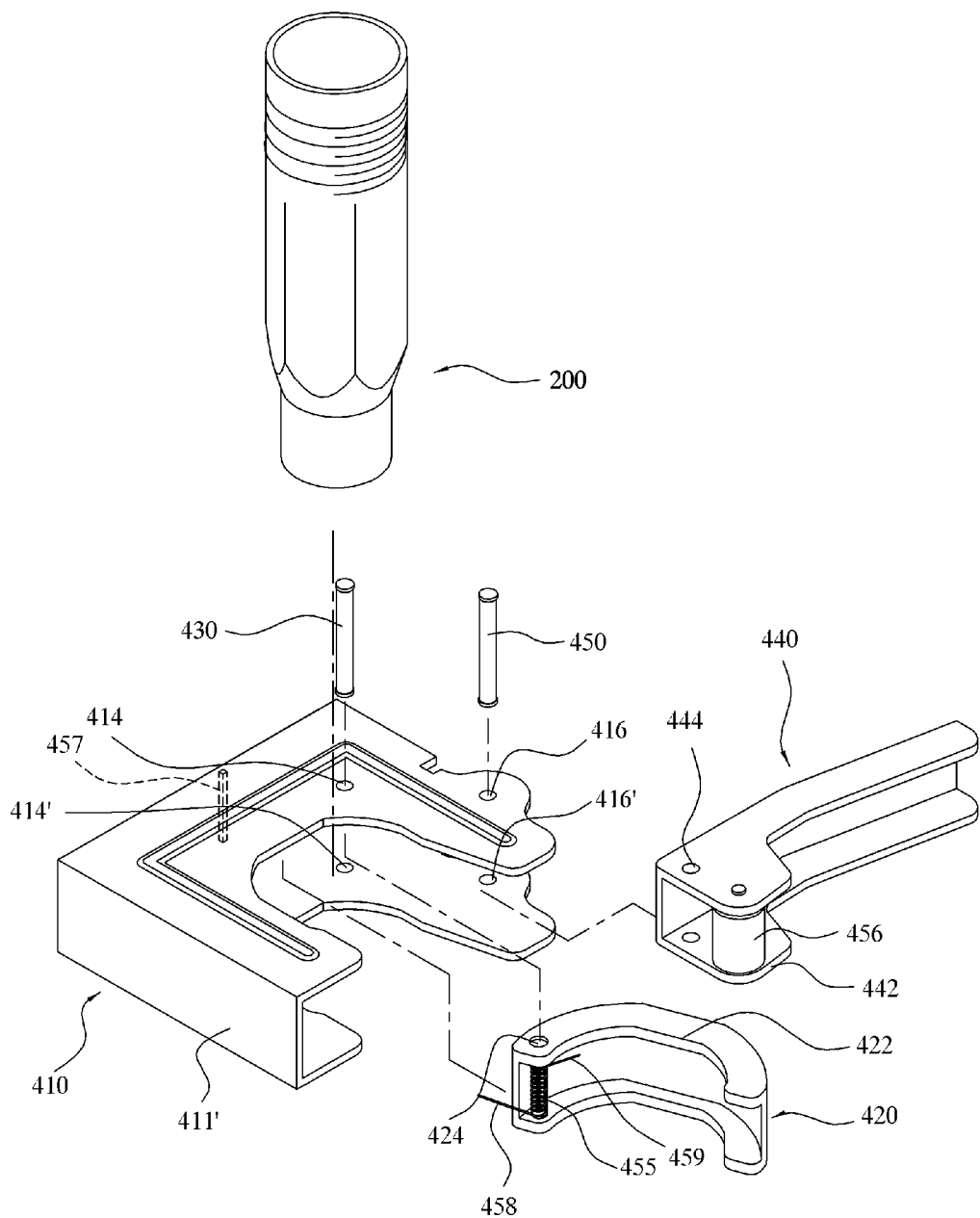
FIG. 8 is a view illustrating an operational state of the center bracket for fixing a fire-fighting sprinkler.
Figure 9:
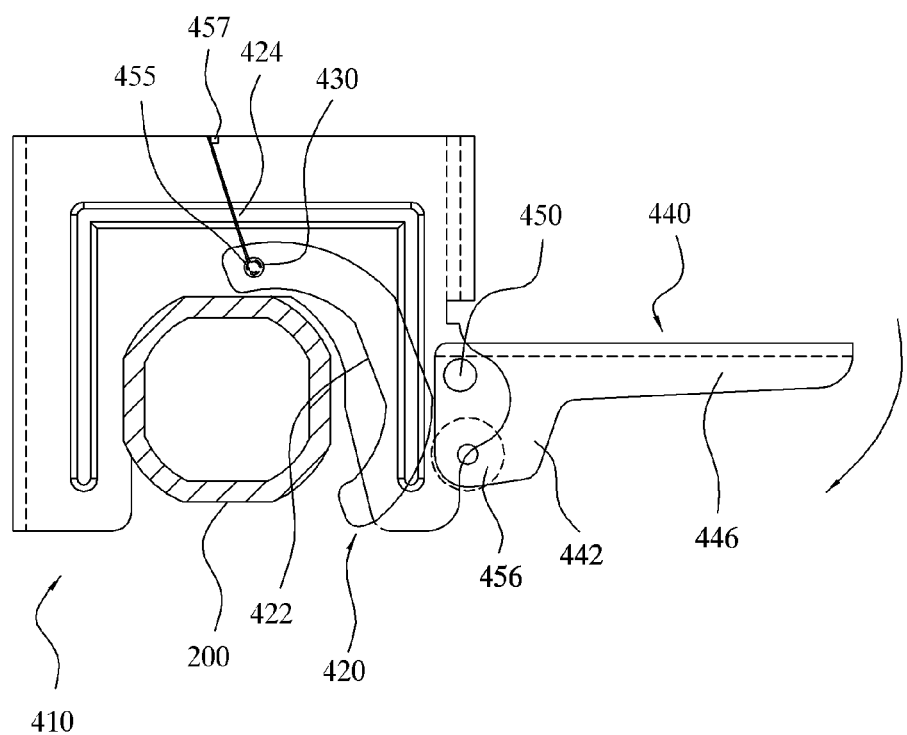
FIG. 9 is a view illustrating a state in which a roller bearing is mounted to a cam protrusion of the center bracket.

As shown in FIGS. 8 and 9, the locking part 440 and the contact piece 420 are coupled to the center bracket 410. While the locking part 440 pivots, the cam protrusion 442 of the locking part 440 causes the contact piece 420 coupled to the center bracket 410 to move linearly. As the contact piece 420 moves linearly, the sprinkler is securely fixed by the concave portion 422 of the contact piece 420. The contact piece 420 is provided with a spring. The spring applies an elastic force to the contact piece 420 in a direction away from the opened side portion of the bent plates 411 and 411' of the center bracket 410 so that the opened side portion of the center bracket 410 is widely opened and thus the sprinkler can be conveniently mounted to the center bracket 410. The spring may be configured with a coil spring 455 or other elastic springs. Accordingly, a user or a technician can easily mount the sprinkler to the center bracket 410 and thus working efficiency is enhanced.

The hinge pin 430 is inserted through the pin hole 424 of the contact piece 420 coupled to the center bracket 410, and the coil spring 455 provided at the contact piece 420 includes a first end portion 458 which is caught by a support protrusion 457 of the center bracket 410 and a second end portion 459 which is caught by the contact piece 420, thereby biasing the contact piece 420 in a direction away from the opened side portion of the center bracket 410 so that the opened side portion of the center bracket 410 can be kept widely opened. As described above, by virtue of the coil spring 458 or the elastic spring provided at the contact piece 420, a technician does not need to additionally manipulate the contact piece 420 in mounting the sprinkler to the center bracket 410.

The center bracket 410 of the present invention is structured such that the sprinkler 200 can be coupled to the center bracket 410 after the support frame is fitted into the center bracket 410. The locking part 440 includes the cam lever 446 and the cam protrusion 442 formed at an end portion of the cam lever 446. As the cam protrusion 442 having an eccentric axis pivots, the sprinkler 200 is clamped by the concave portion of the contact piece 420.

In fastening the locking part 440 by bare hands, large frictional force acts on a contact area between the cam protrusion 442 and the contact piece 420 and accordingly, large force may be necessary to fasten the locking part 440. In order to minimize force necessary to fasten the locking part 440 by minimizing frictional force, a ball or roller bearing 456 is provided at the locking part 440. When fastening the locking part 440, the roller bearing 456 rotates on the contact piece 420 and accordingly, the cam protrusion can smoothly move over an uneven surface of the contact piece 420. As such, the roller bearing 456 enables a technician to easily fasten the locking part 440 with small force.

Figure 10:
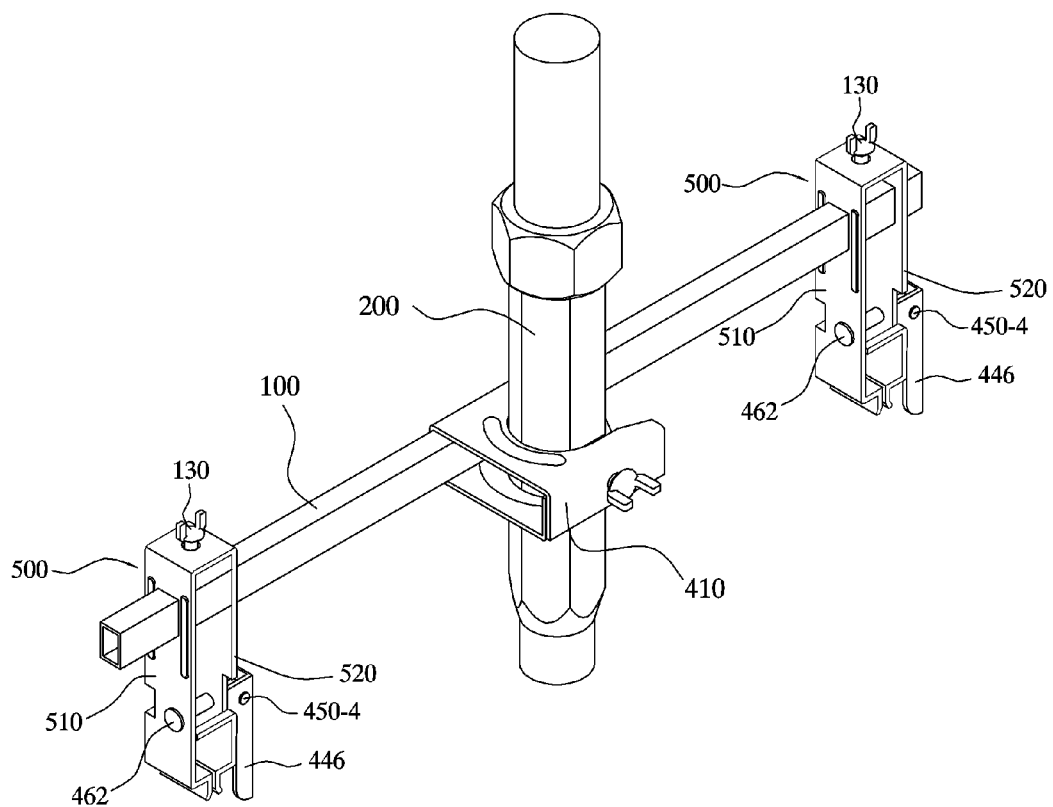
FIG. 10 is a perspective view illustrating a state in which end brackets according to an embodiment of the present invention are mounted to the support frame.
Figure 11:
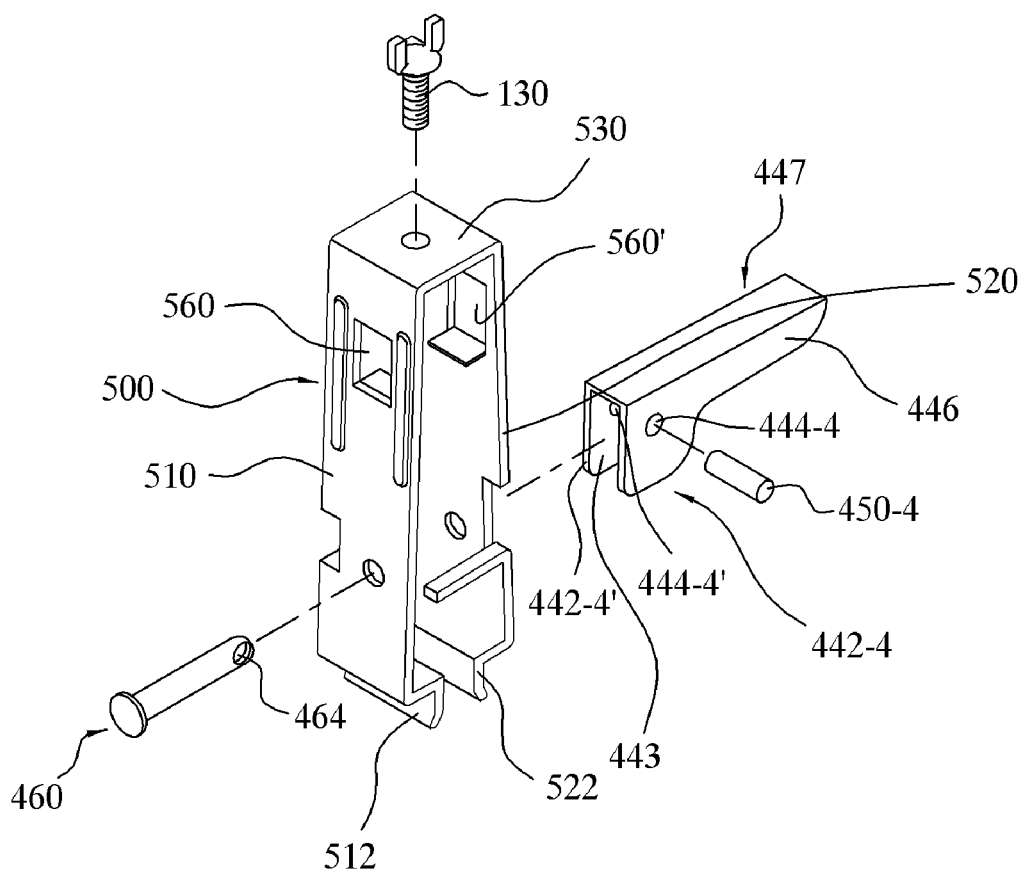
FIG. 11 is an exploded perspective view illustrating a state in which a locking part is coupled to a side surface of the end bracket.
Figure 12:
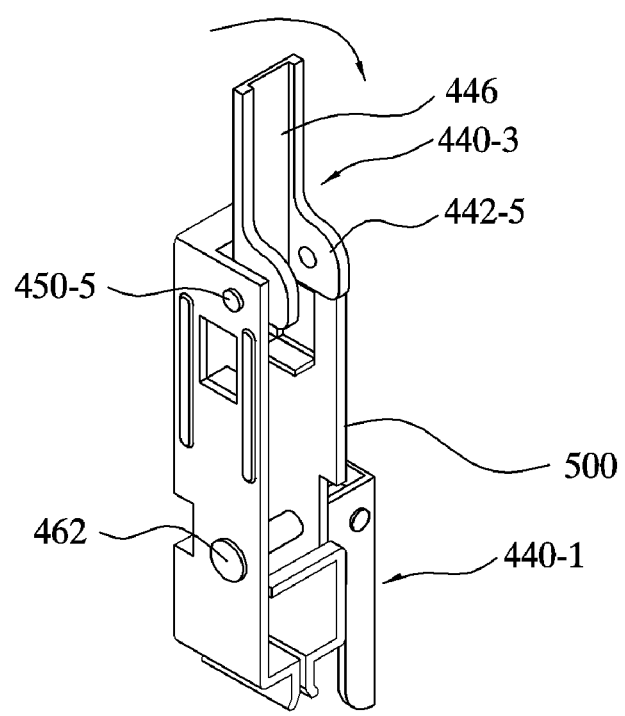
FIG. 12 is a perspective view illustrating the end bracket according to an embodiment of the present invention.

As shown in FIGS. 10 through 12, in addition to the center bracket to fix the fire-fighting sprinkler to the support frame, the bracket for fixing the fire-fighting sprinkler further includes end brackets mounted to both end portions of the support frame in order to fix the support frame to a ceiling. Each of the end brackets for fixing the support frame 100 coupled to the sprinkler includes an inner clamp 510, an outer clamp 520 which is spaced apart from the inner clamp 510, and an upper connection plate 530 to connect the inner clamp 510 and the outer clamp 520 with a constant interval between the inner and outer clamps 510 and 520. The inner clamp 510 is formed with a lower protruding surface 512 at a lower end portion thereof, and the outer clamp 520 is formed with a lower protruding surface 522 at a lower end portion thereof.

The inner clamp 510 and the outer clamp 520 are formed with support frame insertion holes 560 and 560' through which the support frame 100 is fitted. The end bracket further includes a support frame fixing part 130 which is provided at the upper connection plate 530 in order to pressurize the support frame 100. The end bracket further includes a locking part 447 which is disposed at a side surface of the outer clamp 520 and is configured to pressurize the inner clamp 510 and the outer clamp 520 so that the lower protruding surface 512 of the inner clamp 510 and the lower protruding surface 522 of the outer clamp 520 closely contact each other.

The locking part 447 includes a fixing pin 460 inserted through the inner and outer clamps 510 and 520, a cam protrusion 448 connected to the fixing pin 460 and having an eccentric axis, and a knob 446 extending from the cam protrusion 448. As the knob 446 pivots from up to down, the cam protrusion 448 also pivots and accordingly, the lower protruding surface 512 of the inner clamp 510 and the lower protruding surface 522 of the outer clamp 520 come into close contact with each other.

The locking part 447 further includes U-shaped pressurizing protrusions 442-4 and 442-4' which are formed at an end portion of the knob 446. The pressurizing protrusions 442-4 and 442-4' define an insertion space 443 therebetween, into which the fixing pin 460 is inserted. The pressurizing protrusions 442-4 and 442-4' are respectively formed with pin holes 444-4 and 444-4' at edge portions thereof. A hinge pin 450-4 is fitted through a fixing hole 464 of the fixing pin 460 and the pin holes 444-4 and 444-4' of the pressurizing protrusions 442-4 and 442-4'. Accordingly, the locking part 447 is coupled to the end bracket 500 in a T shape. The inner clamp 510 and the outer clamp 520 are respectively formed with support frame insertion holes 560 and 560' through which the support frame 100 is inserted. In order to fix the support frame 100, a support frame fixing part 440-3 is provided in a central cut portion of the upper connection plate 530. In detail, the support frame fixing part 440-3 is formed with a pin hole 442-5. A hinge pin 450-5 is fitted through the pin hole 442-5 of the support frame fixing part 440-3. By virtue of the hinge pin 450-5, the support frame fixing part 440-3 can be coupled to the end bracket body 500 and also can pivot about the hinge pin 450-5 with respect to the end bracket body 500, thereby securely fixing the support frame 100 to the inner clamp 510 and the outer clamp 520 of the end bracket 500.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A bracket for fixing a fire-fighting sprinkler including end brackets mounted to both end portions of a support frame to fix the support frame to a ceiling and a center bracket to fix the fire-fighting sprinkler to the support frame, wherein
    the center bracket includes an opened side portion, a hinge pin and a locking part coupled to the hinge pin and configured to pivot about the hinge pin, the locking part including a cam lever and a cam protrusion having an eccentric axis,
    whereby the sprinkler fitted in the center bracket is directly pressurized and clamped by the cam protrusion by pivoting the locking part about the hinge pin while keeping the opened side portion opened,
    wherein the cam protrusion is formed at one end portion of the cam lever, and the locking part further includes one of a ball bearing and a roller bearing which is rotatably coupled to a hinge pin mounted to an edge portion of the cam protrusion, whereby as the locking part pivots, the sprinkler is pressurized and clamped by the ball bearing or the roller bearing which rotates about the hinge pin.

2. The bracket according to claim 1, wherein the center bracket further includes a contact piece provided between the cam lever and the sprinkler in order to securely fix the sprinkler.

3. The bracket according to claim 1, wherein the center bracket further includes a contact piece provided between the cam lever and the sprinkler, and wherein the contact piece is provided with one of a coil spring and an elastic spring at one end portion thereof, which biases the contact piece away from the opened side portion of the center bracket so that the sprinkler is easily mounted to the center bracket.

4. The bracket according to claim 1, wherein the center bracket further includes a pin hole, a hinge pin inserted into the pin hole, and a contact piece coupled to the hinge pin and configured to pivot about the hinge pin, and wherein the contact piece is formed with a separation prevention protrusion at a side surface thereof.

5. A bracket for fixing a fire-fighting sprinkler including end brackets mounted to both end portions of a support frame to fix the support frame to a ceiling and a center bracket to fix the fire-fighting sprinkler to the support frame, wherein the center bracket includes an opened side portion, a hinge pin and a locking part coupled to the hinge pin and configured to pivot about the hinge pin, the locking part including a cam lever and a cam protrusion having an eccentric axis, whereby the sprinkler fitted in the center bracket is directly pressurized and clamped by the cam protrusion by pivoting the locking part about the hinge pin while keeping the opened side portion opened, wherein the cam protrusion is formed at one end portion of the cam lever, and the locking part further includes a pin hole formed at an edge portion of the cam protrusion, a curved protrusion formed at another edge portion of the cam protrusion and a concave portion formed between the cam protrusion and the curved protrusion.

6. The bracket according to claim 5, wherein the center bracket further includes a contact piece provided between the cam lever and the sprinkler in order to securely fix the sprinkler.

7. The bracket according to claim 5, wherein the center bracket further includes a contact piece provided between the cam lever and the sprinkler, and wherein the contact piece is provided with one of a coil spring and an elastic spring at one end portion thereof, which biases the contact piece away from the opened side portion of the center bracket so that the sprinkler is easily mounted to the center bracket.

8. The bracket according to claim 5, wherein the center bracket further includes a pin hole, a hinge pin inserted into the pin hole, and a contact piece coupled to the hinge pin and configured to pivot about the hinge pin, and wherein the contact piece is formed with a separation prevention protrusion at a side surface thereof.

9. A bracket for fixing a fire-fighting sprinkler including end brackets mounted to both end portions of a support frame to fix the support frame to a ceiling and a center bracket to fix the fire-fighting sprinkler to the support frame, wherein each of the end brackets includes an inner clamp formed with a lower protruding surface at a lower end portion thereof and a support frame insertion hole through which the support frame is fitted, an outer clamp formed with a lower protruding surface at a lower end portion thereof and a support frame insertion hole through which the support frame is fitted, an upper connection plate to connect the inner clamp and the outer clamp with a constant interval between the inner clamp and the outer clamp, a support frame fixing part provided at the upper connection plate in order to pressurize the support frame, and a locking part disposed at a side surface thereof in order to pressurize the inner clamp and the outer clamp, wherein the locking part includes a fixing pin inserted through the inner clamp and the outer clamp, a cam protrusion connected to the fixing pin and having an eccentric axis, and a knob extending from the cam protrusion, whereby as the knob pivots from up to down, the cam protrusion pivots to pressurize the inner clamp and the outer clamp, and the lower protruding surface of the inner clamp and the lower protruding surface of the outer clamp contact each other, wherein the support frame fixing part is provided in a central cut portion of the upper connection plate and is formed with a pin hole, and the inner clamp and the outer clamp are respectively formed with pin holes, and wherein a hinge pin is fitted through the pin hole of the support frame fixing part and the pin holes of the inner clamp and the outer clamp so that the support frame fixing part is coupled to each of the end brackets and pivots about the hinge pin, thereby fixing the support frame to the inner clamp and the outer clamp.

10. The bracket according to claim 9, wherein the locking part further includes U-shaped pressurizing protrusions formed at an end portion of the knob and respectively having pin holes at edge portions thereof, an insertion space formed between the pressurizing protrusions, into which the fixing pin is inserted, and a hinge pin fitted through a fixing hole of the fixing pin and the pin holes of the pressurizing protrusions, whereby the locking part is coupled to each of the end brackets in a T shape.

* * * * *